United States Patent [19]
Henley et al.

[11] 3,819,051
[45] June 25, 1974

[54] PROCESS FOR TREATING WASTES CONTAINING CHROMATES AND/OR COMPLEX IRON CYANIDES

[75] Inventors: Thomas D. Henley, Broomall; Richard F. Reeves, Roslyn, both of Pa.

[73] Assignee: Amchem Products, Inc., Ambler, Pa.

[22] Filed: Aug. 31, 1972

[21] Appl. No.: 285,190

[52] U.S. Cl. ................................................ 210/50
[51] Int. Cl. .............................................. C02c 5/02
[58] Field of Search ............ 210/42, 50, 51, 55, 59, 210/60, 63; 423/367

[56] References Cited
UNITED STATES PATENTS

| | | | |
|---|---|---|---|
| 2,038,969 | 4/1936 | Teats | 423/367 X |
| 3,575,853 | 4/1971 | Gaughan et al. | 210/50 X |
| 3,575,854 | 4/1971 | Richards | 210/50 |
| 3,715,308 | 2/1973 | Sulfaro et al. | 210/60 |
| 3,729,413 | 4/1973 | Csuros | 210/59 |

OTHER PUBLICATIONS

Hoover, C. R., et al., "Disposal of Waste Liquors from Chromium Plating," Ind. & Eng. Chem., Vol. 33, No. 1, Jan., 1941, pp. 131–134.

*Primary Examiner*—Thomas G. Wyse
*Attorney, Agent, or Firm*—Synnestvedt & Lechner

[57] ABSTRACT

Dissolved hexavalent chromium and dissolved complex iron cyanide [$Fe(CN)_6$] are removed from a liquid waste effluent by adding thereto a reducing agent having an anion capable of reducing said hexavalent chromium to trivalent chromium and a cation which forms a solid or precipitate with said complex iron cyanide. The preferred reducing agent is zinc hydrosulfite ($ZnS_2O_4$).

9 Claims, No Drawings

PROCESS FOR TREATING WASTES CONTAINING CHROMATES AND/OR COMPLEX IRON CYANIDES

FIELD OF THE INVENTION

This invention relates to the treatment of industrial liquid waste effluents to remove therefrom toxic materials and ingredients which are capable of forming toxic materials. More particularly, this invention relates to the treatment of industrial liquid waste effluents which contain precursors of toxic cyanide and/or toxic hexavalent chromium.

There are a goodly number of industrial applications in which dissolved ferricyanide ($[Fe(CN)_6]^{-3}$) is used to great advantage. This complex iron cyanide is not a toxic material, but under certain conditions it has a tendency to decompose to cyanide (CN) which is very toxic. Such conditions can exist in sewage plants, streams, lakes and other bodies of water into which liquid waste effluents containing the aforesaid iron cyanide in dissolved form are discharged or find their way. The presence of extremely small amounts of cyanide, for example a few parts per million, can be fatal to microorganisms, fish and other aquatic life that live in such environments. Despite the harm that can emanate from discharging liquid effluents containing ferricyanide into sewage systems and natural bodies of water, it is, nevertheless, common practice to do so. A reason for this is that there has not heretofore been available a practical and economical method for removing this complex iron cyanide from the liquid effluent.

Hexavalent chromium is a material which itself is very toxic, but, nevertheless, one which is used extensively in industrial applications (where it is present in dissolved forms such as $CrO_4^{-2}$ and $Cr_2O_7^{-2}$), including applications in which ferricyanide is present also. The presence of hexavalent chromium in amounts as small as one part per million can be fatal to living matter. Liquid waste effluents containing it can create havoc when discharged into sewage treatment plants or natural bodies of water.

An example of an industrial process in which both ferricyanide and hexavalent chromium are used is in the application to aluminum surfaces of coatings which are corrosion resistant and which have characteristics such that paint adheres readily and strongly to the coatings. Hexavalent chromium and ferricyanide are ingredients of a popularly used acidic aqueous coating solution which forms such coatings on aluminum surfaces. Such an acidic coating solution also contains fluoride and may contain other ingredients such as sodium fluoborate, potassium fluozirconate and nitric acid.

A characteristic common to the various methods that are utilized for applying the above described coating solution to the aluminum surface is the accumulation of quantities of used solution from run off, rinsing, dripping, etc. Such quantities of solution or effluent are discharged usually into the waste system of the plant whence it can flow into a sewage treatment plant or body of water to cause the problems described above. The concentrations of the ingredients comprising the effluent are generally lower than those comprising the unused coating solution (because of dilution or consumption of the ingredients in forming the coating), but nevertheless can be sufficiently high to cause the aforementioned problems. It is noted also that situations can arise during the coating process when it is desirable or even necessary to dispose of quantities of the unused or undiluted coating solution into the waste system.

This invention relates to the removal of hexavalent chromium and/or complex iron cyanides from a liquid waste effluent.

REPORTED DEVELOPMENTS

Various methods have been proposed for removing dissolved hexavalent chromium and dissolved complex iron cyanides from liquid waste effluents.

For example, U.S. Pat. No. 3,391,789 discloses that toxic hexavalent chromium can be removed from a liquid waste effluent by reducing the hexavalent chromium to trivalent chromium with reducing agents such as sulfur dioxide or hydrogen sulfide. The trivalent chromium can be separated from the liquid waste effluent by precipitation in the form of $Cr(OH)_3$ using an alkaline reagent. This patent discloses also that cyanide which may be present in the liquid waste effluent can be removed by an alkaline chlorination method, wherein the cyanide is oxidized to carbonaceous and nitrogenous end products in the presence of alkali which prevents the evolution of toxic gases such as nitrogen trichloride or cyanogen chloride. There is no disclosure in this patent respecting the presence or removal of complex iron cyanides.

It has been reported also that hexavalent chromium and a complex iron cyanide can be removed from a liquid waste effluent by adding thereto a reducing agent which reduces the hexavalent chromium to trivalent chromium and another material which precipitates the complex iron cyanide. Examples of reducing agents that are reported to reduce the hexavalent chromium to trivalent chromium are sulfur dioxide, sulfurous acid, bisulfites, ferrous sulfate, sodium thiosulfate, sodium oxalate and potassium iodide. The preferred material for precipitating the complex iron cyanide is reported to be ferrous sulfate, although general reference is made to the use of materials which contain other cations, which precipitate the complex iron cyanide, such as lead, cobalt, silver, zinc, bismuth, copper and tin. This method requires the use of a relatively large quantity in excess of the stoichiometric quantity of ferrous ion to remove substantially all of the complex iron cyanide, for example, a quantity of ferrous ion such that the molar ratio of ferrous ion to said complex iron cyanide is at least 7 to 1, and preferably at least 14 to 1.

U.S. Pat. No. 3,505,217 discloses that free cyanide or complex iron cyanide can be removed from a liquid waste effluent by treating it with an aldehyde and/or a water soluble bisulfite addition reaction produce compound of the aldehyde. There is no disclosure in this patent respecting the presence or removal of hexavalent chromium.

In view of the above, it is an object of this invention to provide a method for treating an industrial liquid waste effluent to remove therefrom toxic hexavalent chromium and a complex iron cyanide, a precursor of toxic cyanide.

It is another object of this invention to provide a method for removing hexavalent chromium and/or a complex iron cyanide from liquid waste effluents.

BRIEF DESCRIPTION OF THE INVENTION

In accordance with this invention, it has been found that a liquid waste effluent comprising an aqueous solution containing hexavalent chromium and a complex iron cyanide [Fe(CN)$_6$] can be treated to remove therefrom said hexavalent chromium and said complex iron cyanide by adding thereto a reducing agent having an anion which reduces said hexavalent chromium to trivalent chromium and a cation which forms a solid or precipitates said complex iron cyanide.

The trivalent chromium can be removed from the liquid effluent by precipitating it in the form of chromium hydroxide (Cr(OH)$_3$). An alkaline material, preferably lime, is added to the effluent to accomplish this. Trivalent chromium is also a toxic material, but is not considered to be quite as toxic as hexavalent chromium. Some governmental regulations permit higher concentrations of trivalent chromium in a discharged liquid effluent, for example, 1 ppm to a few ppm, than hexavalent chromium, the concentration of which should be less than 1 ppm, for example, 0.05 ppm or less. The Cr(OH)$_3$ precipitate and the solid Fe(CN)$_6$, and any other solids that are present in the liquid effluent can be separated therefrom by any suitable means, such as filtration, centrifugation, etc.

Unless otherwise stated, the term "complex iron cyanide" and the formula "Fe(CN)$_6$" when used herein are shorthand expressions for ferricyanide, ferrocyanide or mixtures thereof. In addition to being used to extract ferricyanide from liquid waste effluents, this invention can be used also to extract ferrocyanide ([Fe(CN)$_6^{-4}$]) from such effluents, as will be explained more fully below. (Like ferricyanide, ferrocyanide is not a toxic material, but it, too, is capable of decomposing to toxic cyanide under certain conditions and, therefore, is an undesirable ingredient of effluents which are discharged to sewage system or natural bodies of water.)

The preferred reducing agent for use in this invention is zinc hydrosulfite (ZnS$_2$O$_4$), also referred to in the literature as zinc dithionite and zinc hyposulfite.

In accordance with this invention, a composition for use in treating the aforementioned type of waste effluents comprises about 20 to about 80 wt. percent of the reducing agent and about 20 to about 80 wt. percent of an alkaline material such as lime [Ca(OH)$_2$]. A preferred composition for use in treating the aforementioned type of waste effluent comprises: (A) about 20 to about 75 wt. percent zinc hydrosulfite; (B) about 20 to about 75 wt. percent lime; and (C) about 5 to about 50 wt. percent of a non-toxic salt of a strong mineral acid, preferably sodium chloride, calcium chloride or calcium sulfate dihydrate.

As will be explained more fully below, the reducing agent of this invention can be used to reduce hexavalent chromium (Cr$^{+6}$) to trivalent chromium (Cr$^{-3}$) in a waste effluent that does not contain complex iron cyanide or it can be used to remove complex iron cyanide from a waste effluent that does not contain Cr$^{+6}$.

The invention described herein can be practiced in a manner such that a number of important advantages can be obtained. One of the most important advantages that can be realized is that an effluent comprising an aqueous solution of hexavalent chromium and ferricyanide or ferrocyanide can be treated so that substantially all of said chromium and said complex iron cyanides are removed from the effluent. Thus, the concentrations of each of the Cr$^{+6}$ and Fe(CN)$_6$ can be reduced to below about one part per million if desired.

Heretofore reported methods for removing Cr$^{+6}$ and Fe(CN)$_6$ from waste effluents require the use of at least two different materials, one for reducing the Cr$^{+6}$ to Cr$^{+3}$, and another for forming a solid with the Fe(CN)$_6$. On the other hand, the reducing agent of this invention accomplishes both of these functions.

By utilizing the reducing agent of the present invention in the preferred pH range, as will be explained more fully below, relatively small quantities of the reducing agent can be used to remove substantially all of the Cr$^{+6}$ and complex iron cyanide. However, in heretofore reported methods, relatively large quantities of the reagent for precipitating the Fe(CN)$_6$ must be used to remove substantially all of the complex iron cyanide. The invention can be practiced in a manner such that the Cr(OH)$_3$ precipitate and the solid formed from the dissolved complex iron cyanide can be separated from the liquid effluent in a one step treatment. Thus, it is not necessary to treat the effluent first to separate therefrom the Cr(OH)$_3$ and then retreat it to extract the complex iron cyanide.

The invention can be utilized to treat without complication effluents which contain, in addition to the Cr$^{+6}$ and complex iron cyanide constituents, other ingredients, examples of which are those present in the aqueous coating solution mentioned above and described more fully below.

Another important advantage of the present invention is that it can be practiced in a manner such that by-products which are toxic or precursors of toxic materials are not formed in the treated effluent from which the Cr$^{+6}$ and complex iron cyanide have been extracted.

The invention can be used also to treat effluents which contain toxic or toxic-forming materials other than Cr$^{+6}$ and a complex iron cyanide, which materials are capable of being converted to ferricyanide or ferrocyanide.

Thus, the present invention affords many operating and economic advantages. Other advantages which are provided by the invention will become apparent from the following detailed description of the invention.

DETAILED DESCRIPTION OF THE INVENTION

As to the effluents that can be treated according to the invention, they can comprise an aqueous solution of hexavalent chromium and a complex iron cyanide, that is ferricyanide or ferrocyanide or mixtures thereof. Other ingredients may be present in the effluent also. Examples of such ingredients are fluoride, complex fluorides and nitric acid, each of which may be used in making up an aqueous coating solution. The effluent may also contain aluminum which is dissolved during coating formation and some trivalent chromium which is formed also during coating formation. In addition, the invention can be used also to treat, as will be described more fully below, an aqueous solution which contains only one of said complex iron cyanide and hexavalent chromium constituents.

The practice of this invention is not limited by the amounts of toxic ingredients and/or precursors of toxic ingredients in the effluent. Sufficient amounts of the reagent for reducing the hexavalent chromium constituent to trivalent chromium and for converting the dissolved complex iron cyanide constituent to a solid can be added to the effluent irrespective of the concentrations of said constituents. Thus, the invention can be utilized to treat an effluent comprising a relatively dilute aqueous solution of hexavalent chromium and complex iron cyanide or it can be utilized to treat a relatively concentrated solution. (For example, (and as noted above) situations do arise when it is necessary to dispose of an unused or partially used solution that contains greater amounts of the ingredients to be extracted than normally present in a fully spent solution. Unless otherwise stated, when the term "effluent" is used herein, it includes within its meaning unused or partially used or fully spent solution containing the ingredients that can be extracted according to the method of this invention.)

Aqueous coating solutions which are a source of industrial waste effluents that can be treated according to the method of this invention are well known; for example, they can comprise about 1 g/l to about 30 g/l of hexavalent chromium (calculated as $CrO_3$), about 0.05 g/l to about 12 g/l of ferricyanide and about 0.07 g/l to about 3 g/l of fluoride. The hexavalent chromium constituent can be added to the solution in the form of chromic acid ($CrO_3$), the ferricyanide constituent constituent in the form of an alkali salt, for example the potassium salt, and the fluoride constituent in the form of hydrofluoric acid or an alkali salt. A specific example of such a coating solution comprises about 5.0 grams of chromic acid, 1.0 gram of potassium ferricyanide and 0.5 gram of hydrofluoric acid per liter of solution.

The aqueous coating solution can contain additional ingredients for the purpose of imparting to it or improving particular properties. For example, the solution can contain a surface active agent or a suitable mineral acid such as nitric acid.

Usually, the effluent of the above described coating solution to be treated will be dilute as compared to the original or unused solution. For example, the proportion of water comprising the dilute effluent may be as much as 5 to 10 times more than that present in the unused solution. The reason for this is that non-aqueous ingredients—including hexavalent chromium and ferricyanide—comprising the solution are consumed as coating is formed on the metallic surface. In addition, the effluent may be diluted further if (as is often done), the coated surface is rinsed with water to remove therefrom unreacted ingredients of the spent solution.

An example of a particular application process in which "dilute" effluent is produced is one wherein a coating solution as described above is applied by the reverse roller technique. In such a process, the coating solution is applied to the top surface of a moving strip of aluminum from a roller whose surface is wetted with the coating solution and is rotating in a direction opposite to that in which the aluminum strip is moving. The underside of the strip can be coated by the use of such a roller positioned beneath the strip. As the coating solution is applied to the strip from the rollers, some of it tends to drip from the strip. This coating solution effluent is often collected in a container which is positioned beneath the strip. Squeegeeing of the strip to remove therefrom excess or spent solution also produces drippings of effluent. A portion of the effluent is usually spent solution and this accounts for its dilute nature. If a water rinse is employed, it causes additional dilution of the effluent.

By way of specific example, it is noted that the effluent collected from a plant run coating operation wherein coating solution was applied by the reverse roller technique and wherein a water rinse was employed, contained 1.5 g/l of $CrO_3$ and 0.6 g/l of potassium ferricyanide. On the other hand, the concentrations of these ingredients in the coating solution being applied to the aluminum surface contained 20 g/l of $CrO_3$ and 12 g/l of potassium ferricyanide.

As noted above, industrial liquid waste effluents which contain hexavalent chromium, but no complex iron cyanide, can be treated advantageously in accordance with this invention also. An example of such an effluent is an aqueous final rinse solution containing hexavalent chromium and, optionally, chromium in reduced form, for example, trivalent chromium. Such final rinse solutions are used widely to improve the corrosion resistant properties of protective coatings, such as zinc phosphate and chromate coatings, which are applied to metal surfaces to impart corrosion resistant and paint adherent properties thereto. Such coatings are simply rinsed with the final rinse solution.

An exemplary final rinse solution containing hexavalent chromium comprises an aqueous solution containing about 0.05 to about 0.5 g/l of hexavalent chromium. An exemplary final rinse solution containing hexavalent chromium and reduced chromium comprises an aqueous solution containing a total chromium concentration of about 0.15 g/l (expressed as $CrO_3$) to about 2 g/l wherein about 40 to about 95 percent of the chromium is in the hexavalent state and the remainder of the chromium is in a reduced state (see U.S. Pat. No. 3,063,877).

The use of a hydrosulfite in accordance with this invention to reduce hexavalent chromium to trivalent chromium has advantages over heretofore used reducing agents. For example, in utilizing heretofore used reducing agents, such as alkali metal bisulfites and alkali metal meta-bisulfites, to reduce the hexavalent chromium to trivalent chromium, and thereafter precipitating $(Cr(OH)_3$, the soluble alkali metal salts remain in the liquid effluent. This is not desirable because the dissolved solids content of the effluent is increased. In contrast, the use of a hydrosulfite containing a cation, the hydroxide of which is insoluble, such as zinc hydroxide, diminishes the presence of dissolved solids in the liquid effluent.

The use of other heretofore known reducing agents, such as $SO_2$ and $H_2SO_3$, has disadvantages also when compared to the use of hydrosulfites in accordance with this invention. For example, $SO_2$ and $H_2SO_3$ are effective reducing agents only at very low pH ranges, for example, at pH ranges of about 2 to about 3.5. (Furthermore, if the effluent has a higher pH, these reducing agents evolve $SO_2$ gas which is very pungent). Thus, if the effluent does not initially have a pH within the aforementioned range, acid, such as sulfuric acid, must be added to the effluent to reduce the pH thereof. Thereafter, substantially large quantities of alkaline material must be added to the effluent to raise the pH in order to precipitate $Cr(OH)_3$. On the other hand, the hydrosulfite reducing agents of the invention are effective in a higher pH range, and in a pH range which a dilute $Cr^{+6}$ containing effluent is likely to have.

The use of the reducing agent of the present invention also has advantages over the use of other types of reagents which have been used to form solids with dissolved complex iron cyanide contained in a liquid waste effluent. (An example of such a liquid effluent is one obtained from the treatment of a cyanide solution with iron in a metal stripping operation.) It has been found that in the use of a reducing agent in accordance with this invention, for example, zinc hydrosulfite, ferricyanide is reduced to ferrocyanide, and thereafter insoluble zinc ferrocyanide is precipitated. The reduction of the ferricyanide radical to the ferrocyanide radical is advantageous because the ferrocyanide is more insoluble than the ferricyanide. This affords a more efficient process for removing the complex iron cyanide from the liquid waste effluent.

As mentioned hereinabove, the reducing agent for use in accordance with this invention has an anion which is capable of reducing hexavalent chromium to trivalent chromium and a cation which forms a solid with the complex iron cyanide.

The preferred reducing agent is a hydrosulfite, preferably zinc hydrosulfite. Zinc hydrosulfite is commercially available as a free-flowing dry white material in the form of fine white crystals which are readily soluble in water, for example, soluble to the extent of about 40 parts/100 parts of $H_2O$ at 68° F. Zinc hydrosulfite, which is a known reducing agent for use in many other types of applications, is prepared by the reaction of metallic zinc with sulfur dioxide.

The use of zinc hydrosulfite affords a number of advantages. It is a readily available material which effectively and efficiently reduces hexavalent chromium to trivalent chromium in the pH range often possessed by dilute effluents containing hexavalent chromium; and it effectively and efficiently forms a solid with the complex iron cyanide in the effluent. In so functioning, the zinc hydrosulfite does not produce in the liquid effluent any undesirable toxic by-products that cannot be removed readily therefrom by suitable pH adjustment.

The pH of the waste effluent to be treated should be adjusted, if necessary, to a range or value at which the reducing agent operates most effectively. (As will be explained more fully below, the pH of the waste effluent can be adjusted, either by the addition of an alkaline material or an acid.) For example, in utilizing zinc hydrosulfite, the pH of the liquid waste effluent should be about 4 to about 9, and preferably about 4.5 to about 7. In operating in the preferred pH range of about 4.5 to about 7, smaller quantities of the zinc hydrosulfite can be used to reduce substantially all of the $Cr^{+6}$ to $Cr^{+3}$ than when the pH of the effluent is outside the preferred range.

It has been found that to reduce substantially all of the $Cr^{+6}$ to $Cr^{+3}$ in a waste effluent having a pH of about 4.5 to about 7, a weight ratio of zinc hydrosulfite to hexavalent chromium of about 4/1 to about 14/1 should be used. On the other hand, when operating at a pH of about 4 to about 4.5 or about 7 to about 9, it has been found that to reduce substantially all of the $Cr^{+6}$ to $Cr^{+3}$, higher weight ratios of zinc hydrosulfite to hexavalent chromium should be used, for example, up to about 25/1, depending on the specific pH of the effluent.

Turning now to the steps utilized in treating the liquid effluent, the pH thereof should be adjusted, if necessary to a value of about 4 to about 9, and preferably about 4.5 to about 7. Speaking generally, aqueous coating solutions of the type described above are quite acidic, for example their pH can be within the range of about 0.8 to about 2.2. The diluted or spent solution is acidic also, but usually not as acidic as the unused solution. Often the pH of the spent or dilute solution comprising the effluent will have a pH in the range of about 4 to about 10. A suitable alkaline material such as lime or a suitable acid such as sulfuric can be added to the effluent if it is desired to adjust the pH thereof. Materials which interfere with the desired reactions should be avoided. For example, in using zinc hydrosulfite, an acid such as phosphoric acid should not be used to adjust the pH of the effluent because the phosphate ion will react with the zinc ion and thereby reduce the amount of zinc needed to react with the complex iron cyanide.

Available techniques can be utilized to determine the $Cr^{+6}$ and $Fe(CN)_6$ concentrations of the effluent and the pH thereof to figure the amount of reducing agent to add to the effluent. It may be more convenient to record the concentrations of the ingredients in the original solution and then estimate the extent to which the effluent is diluted. In practicing the invention, it is unnecessary to determine whether the complex iron cyanide is present in the ferricyanide or ferrocyanide form.

Utilizing hydrosulfite, $Cr^{+6}$ is reduced to $Cr^{+3}$, ferricyanide is reduced to ferrocyanide, and the selected cation of the reducing agent forms a solid with ferrocyanide and any ferricyanide that may not have been reduced. The reduction by the hydrosulfite can be effected at room temperature in a very short period of time, for example, about 2 to about 30 minutes.

It is desirable, if necessary, to alkalize the effluent to precipitate as many dissolved solids in the effluent as will precipitate in a basic medium. For example, by raising the pH of the effluent from about 8 to about 9, in addition to precipitating $Cr(OH)_3$ and solid complex iron cyanide, the following materials which may be present in the effluent which precipitate also: aluminum hydroxide; calcium fluoride; and zinc hydroxide. The source of aluminum in the effluent would be aluminum ions which are dissolved during formation of the corrosion resistant coating, the source of fluoride would be that originally present in the coating solution, and the source of zinc would be any excess zinc that is not needed to form a solid with the complex iron cyanide.

The aforementioned solids can be separated from the liquid effluent by decanting, filtering or other suitable means. The liquid effluent, substantially free of $Cr^{+6}$, $Cr^{+3}$, and $Fe(CN)_6$ can then be discharged to the waste system of the plant.

A strong basic or alkaline material can be used to alkalyze the effluent as described above. Examples of such materials include the oxides and hydroxides of alkali metals and alkali earth metals. It is preferred to use an alkaline material which precipitates as many of the constituents present in the effluent as feasible. This will reduce the dissolved solids content of the effluent. Oxides and hydroxides of alkali earth metals will accomplish this to a much greater extent that the corresponding alkali metal compounds which are very soluble in the aqueous effluent.

Although oxides and hydroxides of alkali earth metals, such as magnesium, can be used to alkalyze the effluent, it is preferred to utilize lime for a variety of reasons. Lime is relatively inexpensive and it tends to precipitate with a variety of ingredients that might be present in the effluent such as fluoride and phosphate. Also, lime has a relatively low solubility in the aqueous effluent so that any excess added thereto will tend to precipitate. Also, lime more effectively precipitates trivalent chromium than some other alkaline materials.

In the practice of the present invention, it is preferred that the liquid effluent be treated by adding thereto a solid composition, preferably in the form of a powder mixture of the reducing agent and an alkaline material, for example, a mixture of zinc hydrosulfite and lime. The ingredients comprising the aforementioned mixture should be present in amounts sufficient so that upon addition to the effluent, substantially all of the $Cr^{+6}$ will be reduced to $Cr^{+3}$, substantially all of the $Cr^{+3}$ and complex iron cyanide will be precipitated, and other ingredients in the effluent will be precipitated also. The amounts of reducing agent and alkaline material comprising the aforementioned mixture will tend to vary depending on the ingredients and amounts comprising the effluent. In general, a composition comprising about 20 to about 80 wt. percent of the reducing agent and about 20 to about 80 wt. percent of the alkaline material will be effective to accomplish the above. The preferred ingredients comprising the aforementioned mixture are zinc hydrosulfite and lime.

It has been found useful to incorporate in the aforementioned mixture calcium sulfate as an additional source of calcium ion for precipitating materials, such as fluorides and phosphates, that may be present in the effluent. The advantage of using calcium sulfate is that the pH of the effluent is not affected to the extent that it would be by the addition of a strongly alkaline material such as lime. Other non-toxic salts of a strong mineral acid which have a cation that will precipitate materials such as fluorides and phosphates can be used also.

Also, in accordance with this invention, it has been found that the presence of chloride in the effluent increases the reaction rate at which the $Cr^{+6}$ is reduced to $Cr^{+3}$ by the reducing agent.

Thus, in accordance with the above, for certain applications, it will be found advantageous to treat the effluent with a powder mixture comprising the following:

A. about 20 to about 75 wt. percent of reducing agent, preferably zinc hydrosulfite;
B. about 20 to about 75 wt. percent of an alkaline material, preferably lime; and
C. about 5 to about 50 wt. percent of a non-toxic salt of a strong mineral acid, preferably calcium sulfate, sodium chloride or calcium chloride or mixtures thereof.

As mentioned above, the zinc hydrosulfite reducing agent is added preferably to the effluent in powder form.

Although a slurry or aqueous solution of zinc hydrosulfite can be added to the effluent, it has been found that the zinc hydrosulfite tends to become unstable in an aqueous medium, being oxidized by air within a relatively short period of time to zinc sulfate. Thus, if an aqueous slurry or solution of zinc hydrosulfite is used, it should be added to the effluent before oxidation thereof to zinc sulfate.

It is noted also that it is expected that the present invention will be used most widely in applications where the effluent contains larger quantities of $Cr^{+6}$ than complex iron cyanide. In such applications, the amount of reducing agent added to reduce substantially all of the $Cr^{+6}$ to $Cr^{+3}$ will also result in a sufficient quantity, or even excess quantity, of cation for forming a solid with the complex iron cyanide. However, if the effluent contains larger quantities of the complex iron cyanide than $Cr^{+6}$, other materials which are a source of the cation, for example, zinc sulfate or other zinc salt, can be added to the effluent to supplement the amount of cation needed to form a solid with the complex iron cyanide. Stoichiometric quantities of the zinc or preferably an excess amount thereof sufficient to convert substantially all of the complex iron cyanide to solid form should be used.

In treating a liquid effluent according to the present invention, quantities of the effluent can be treated at a waste treatment station in a continuous or batch process. Suitable apparatus can be added to convey the effluent to its place of treatment.

EXAMPLES

Examples which follow are illustrative of the practice of the present invention. The reducing agent used in each of the examples was a commercially available zinc hydrosulfite in the form of fine white crystals and having an assay of about 86–88 wt. percent zinc hydrosulfite. (The quantities of zinc hydrosulfite used in the examples which follow refer to the quantities of the commercial material used.) The effluents of the examples were analyzed for $Cr^{+6}$ and $Fe(CN)_6$ content after treatment thereof with the zinc hydrosulfite. The method of analyses was such that: if the $Cr^{+6}$ content was 0.05 ppm or higher, the analysis was reported as positive, and if the $Cr^{+6}$ content was below 0.05 ppm, the analysis was reported as negative; and if the complex iron cyanide content was 0.1 ppm or higher, the analysis was reported as positive, and if lower, the analysis was reported as negative.

EXAMPLE 1

An aluminum coating solution of the type applied to aluminum strip by the reverse roller technique (described hereinabove) was used as the source of the effluent for this example. The coating solution contained: chromic acid; potassium ferricyanide; and hydrofluoric acid. A sample of excess and/or reacted coating solution was collected after the aluminum strip was squeeged and this sample was diluted with water to simulate an effluent that would be obtained if the coating solution had rinsed off the coated aluminum strip with water. The diluted sample of effluent, which had a pH of 4, analyzed as follows: 116.9 ppm $Cr^{+6}$; 6.7 ppm $Cr^{+3}$; and 47.7 ppm $Fe(CN)_6^{+3}$ (other ingredients not reported). The source of the $Cr^{+3}$ was partial reduction of the $Cr^{+6}$ during formation of the coating on the aluminum strip.

To a 100 ml sample of the effluent, there was added 0.0396 g of zinc hydrosulfite. The pH of the resulting effluent was 4.6. Analysis of the effluent was positive, and thus showed the presence of $Cr^{+6}$ and $Fe(CN)_6^{-3}$ in amounts of about 0.05 ppm or higher and about 0.1 ppm or higher respectively. Therefore, an additional 0.0149 g of zinc hydrosulfite was added to the effluent. The pH of the resulting effluent was 4.7. Analysis of this effluent was negative and thus showed that if any $Cr^{+6}$ or $Fe(CN)_6^{-3}$ was present, they were present in amounts below 0.05 ppm and 0.1 ppm respectively. To this effluent, there was added sufficient lime to impart to the effluent a pH of 9.4. This caused additional precipitates to form in the effluent. The precipitate included $Cr(OH)_3$, $Zn_2 Fe(CN)_6$, $CaF_2$, $Zn(OH)_2$ and $Ca(OH)_2$. 48 hours after the addition of the lime, analysis of the effluent for $Cr^{+6}$, $Fe(CN)_6^{-3}$, and $Fe(CN)_6^{-4}$ was negative. It is noted that the weight ratio of zinc hydrosulfite to $Cr^{+6}$ used in this example was 4.65 to 1.

EXAMPLE 2

The same liquid effluent was used in this example as in Example 1, except that it was diluted to a greater extent with water. There was added to 900 ml of the effluent 0.5g of $ZnS_2O_4$. The resulting effluent had a pH of 4.95. Thereafter, sufficient lime was added to impart to the effluent a pH of 8.7. After 3 hours, analyses of the liquid effluent for $Cr^{+6}$ and $Fe(CN)_6$ were negative. Analysis of the liquid effluent for zinc showed a zinc content of 0.6 ppm, thus indicating that almost all of the zinc precipitated in the form of zinc iron cyanide and zinc hydroxide. It is noted that the weight ratio of $ZnS_2O_4$ to $Cr^{+6}$ used in this example was 4.75 to 1.

EXAMPLE 3

The liquid effluent used in this example was of the same type as that used in Example 1, except that the pH of the effluent was 5.8, and it analyzed as follows: 149 ppm $Cr^{+6}$ and 17 ppm $Fe(CN)_6^{-3}$ (other ingredients not reported). To a 1 liter sample of the effluent, there was added 5.7 g of a powder mix containing: 20 wt. percent zinc hydrosulfite; 20 wt. percent lime; and 60 wt. percent calcium sulfate dihydrate (terra alba). The resulting effluent had a pH of 7.8. Solids precipitated from the effluent, and after about 20–30 minutes from the time the powder mix was added thereto, the effluent or supernatant liquid was analyzed for $Cr^{+6}$ and $Fe(CN)_6$. The analyses were negative. It is noted that the weight ratio of zinc hydrosulfite to $Cr^{+6}$ used in this example was 7.65 to 1.

EXAMPLE 4

The same effluent used in Example 3 was used in this example. To a 1 liter sample of the effluent, there was added 3.2 g of a powder mix containing: 50 wt. percent zinc hydrosulfite; 20 wt. percent lime; and 30 wt. percent sodium chloride. The resulting effluent had a pH of 7.5. Solids precipitated from the effluent, and after about 20–30 minutes from the time the powder mix was added thereto, the effluent or supernatant liquid was analyzed for $Cr^{+6}$ and $Fe(CN)_6$. The analyses were negative. It is noted that the weight ratio of zinc hydrosulfite to $Cr^{+6}$ used in this example was 10.8 to 1.

EXAMPLE 5

The same effluent used in Example 3 was used in this example. To a 1 liter sample of the effluent, there was added 3.4 g of a powder mix containing: 50 wt. percent zinc hydrosulfite and 50 wt. percent lime. The pH of the resulting effluent was 8.3. Solids precipitated from the effluent, and after about 20–30 minutes from the time the powder mix was added thereto, the effluent or supernatant liquid was analyzed for $Cr^{+6}$ and $Fe(CN)_6$. The analyses were negative. It is noted that the weight ratio of zinc hydrosulfite to $Cr^{+6}$ used in this example was 11.4 to 1.

In summary it can be said that the present invention affords an efficient and effective method for removing toxic materials and precursors of toxic materials from industrial liquid waste effluents, thereby providing a practical and economical method for avoiding damage to the natural environment.

We claim:

1. A method for removing hexavalent chromium and complex iron cyanide [$Fe(CN)_6$] from an industrial liquid waste effluent comprising adding to said effluent zinc hydrosulfite, reducing said hexavalent chromium to trivalent chromium with said hydrosulfite and forming a solid complex iron cyanide by reacting said complex iron cyanide with said zinc, forming solid $Cr(OH)_3$ from said trivalent chromium, and separating each of said solids from the liquid phase of said effluent.

2. A method according to claim 1 wherein the pH of said liquid waste effluent during said reduction is about 4 to about 9.

3. A method according to claim 2 wherein the weight ratio of said hydrosulfite to said hexavalent chromium is about 4 to 1 or greater.

4. A method according to claim 1 wherein the pH of said liquid effluent during said reduction is about 4.5 to about 7.

5. A method according to claim 4 wherein the weight ratio of said hydrosulfite to said hexavalent chromium is about 4 to 1 to about 14 to 1.

6. A method for removing ferricyanide from a liquid waste effluent comprising adding to a ferricyanide-containing liquid waste effluent zinc hydrosulfite, reducing said ferricyanide to ferrocyanide with said hydrosulfite and forming solid zinc ferrocyanide in said effluent, and thereafter separating said solid zinc ferrocyanide from said liquid waste effluent.

7. A method for treating the liquid effluent of an aqueous coating solution containing: (i) about 1 g/l to about 30 g/l of hexavalent chromium (calculated as $CrO_3$); (ii) about 0.5 g/l to about 12 g/l of a water soluble salt of ferricyanide; and (iii) about 0.07 g/l to about 3 g/l of fluoride comprising:
  a. adjusting the pH of said solution, if necessary, to a pH of about 4.5 to about 7;
  b. adding to said liquid effluent zinc hydrosulfite in an amount sufficient to reduce substantially all of said hexavalent chromium to trivalent chromium and convert substantially all of said ferricyanide to a solid form of zinc complex iron cyanide;
  c. precipitating from said liquid effluent at a pH of about 7 to about 9 substantially all of said trivalent chromium in the form of $Cr(OH)_3$, all of said zinc complex iron cyanide, a solid salt of said fluoride and any aluminum that may be present in the effluent in the form of aluminum hydroxide;
  d. separating said precipitates from said liquid effluent; and
  e. discharging said effluent substantially free of said hexavalent chromium, trivalent chromium and complex iron cyanide to a waste system.

8. A method according to claim 7 wherein said hydrosulfite is added to said liquid effluent by adding thereto a dry powder composition comprising:
  A. about 20 to about 80 wt. percent of zinc hydrosulfite; and
  B. about 20 to about 80 wt. percent of lime.

9. A method according to claim 8 wherein said dry powder composition comprises:
  A. about 20 to about 75 wt. percent of said zinc hydrosulfite;
  B. about 20 to about 75 wt. percent of said lime; and
  C. about 5 to about 50 wt. percent of sodium chloride, calcium chloride, calcium sulfate or a mixture of at least one of said chlorides with said calcium sulfate.

* * * * *